Jan. 20, 1925.

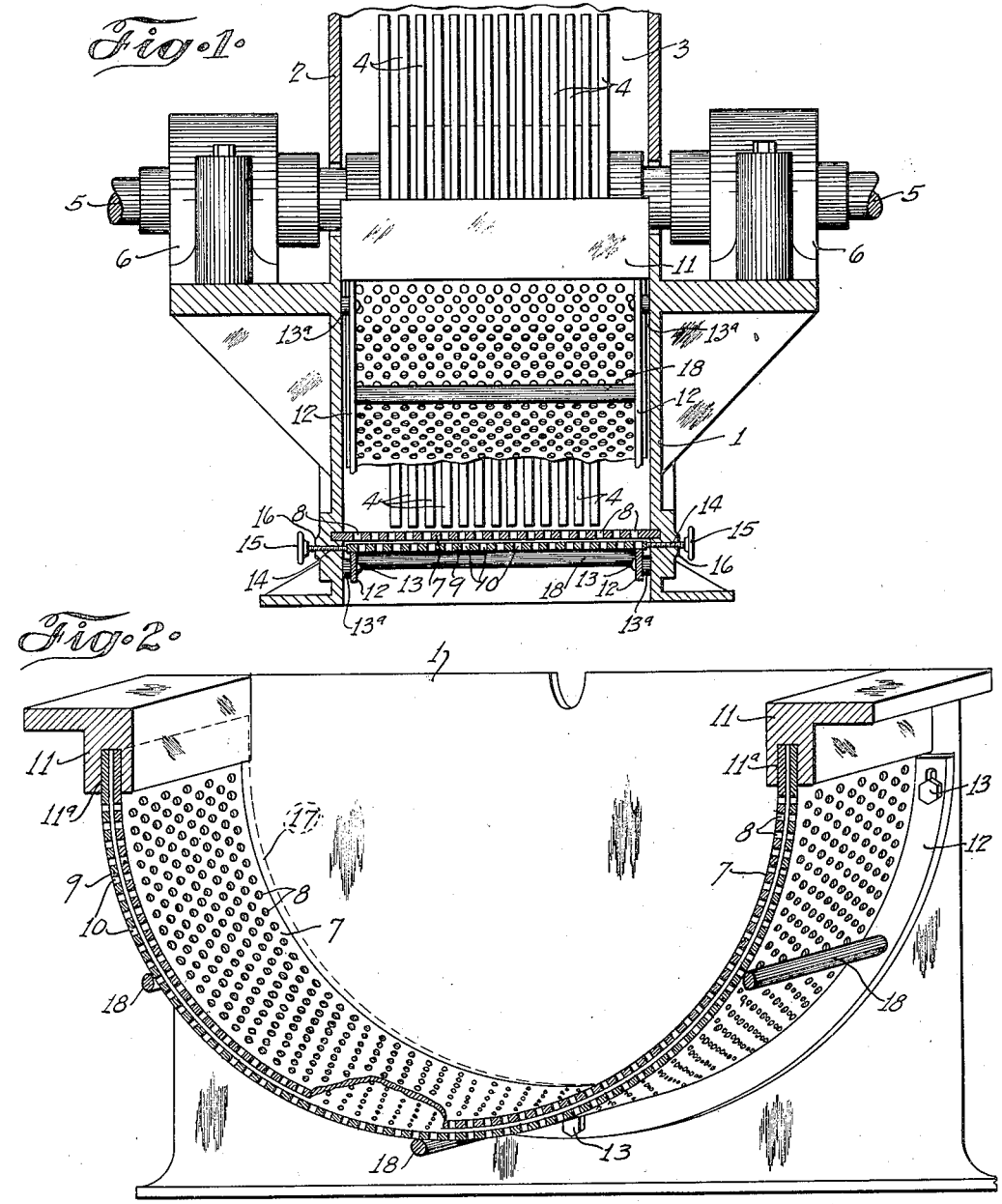

H. J. SHELTON

GRINDER AND SHREDDER

Filed July 14, 1922

1,523,614

2 Sheets-Sheet 2

INVENTOR
Harry J. Shelton
BY J. Henry Kinealy
ATTORNEY

Patented Jan. 20, 1925.

1,523,614

UNITED STATES PATENT OFFICE.

HARRY J. SHELTON, OF ST. LOUIS, MISSOURI.

GRINDER AND SHREDDER.

Application filed July 14, 1922. Serial No. 575,116.

*To all whom it may concern:*

Be it known that I, HARRY J. SHELTON, residing in the city of St. Louis, in the State of Missouri, have invented a new and useful Improvement in Grinders and Shredders, of which the following is a full, clear, and exact specification, reference being had to the accompanying drawings, which form a part thereof.

My invention relates to grinders and shredders, and more particularly to grinders and shredders wherein a perforated plate forms the lower circumferential wall of the grinding chamber.

Heretofore when one material was ground in a grinder or shredder and then it was desired to grind a material to a greater fineness it was necessary to change the perforated plate forming the lower circumferential wall of the grinding chamber therein so as to provide a surface having smaller openings through which the material could be passed when ground. Plates such as usually used in grinders and shredders are made with perforations of different sizes, ranging in diameters from 1/64 of an inch to 1 inch in different plates. If material were to be ground very small a plate with perforations 1/64 of an inch in diameter was used. Plates with larger perforations were used when materials were to be ground with greater coarseness. The changing of the plate each time a material was to be ground to a different degree of fineness was a hard, complicated and tedious task. Besides this trouble of changing the plates there was also the burdensome necessity of keeping for use with the grinder and shredder a complete supply of plates having perforations of different diameters.

The objects of my invention are to provide a grinder and shredder of such construction that the effective or operative size of the perforations in a plate forming the lower circumferential wall of the grinding chamber and through which material being ground or shredded is passed may be changed without removing the plate from the machine; to provide a grinder and shredder which will obviate the necessity of having a number of plates having perforations of different diameters; and to provide a grinder and shredder in which the size of the perforations in the perforated plate therein through which material is passed when it is ground or shredded may be changed quickly, easily and, if so desired, while the machine is operating.

Figure 3:
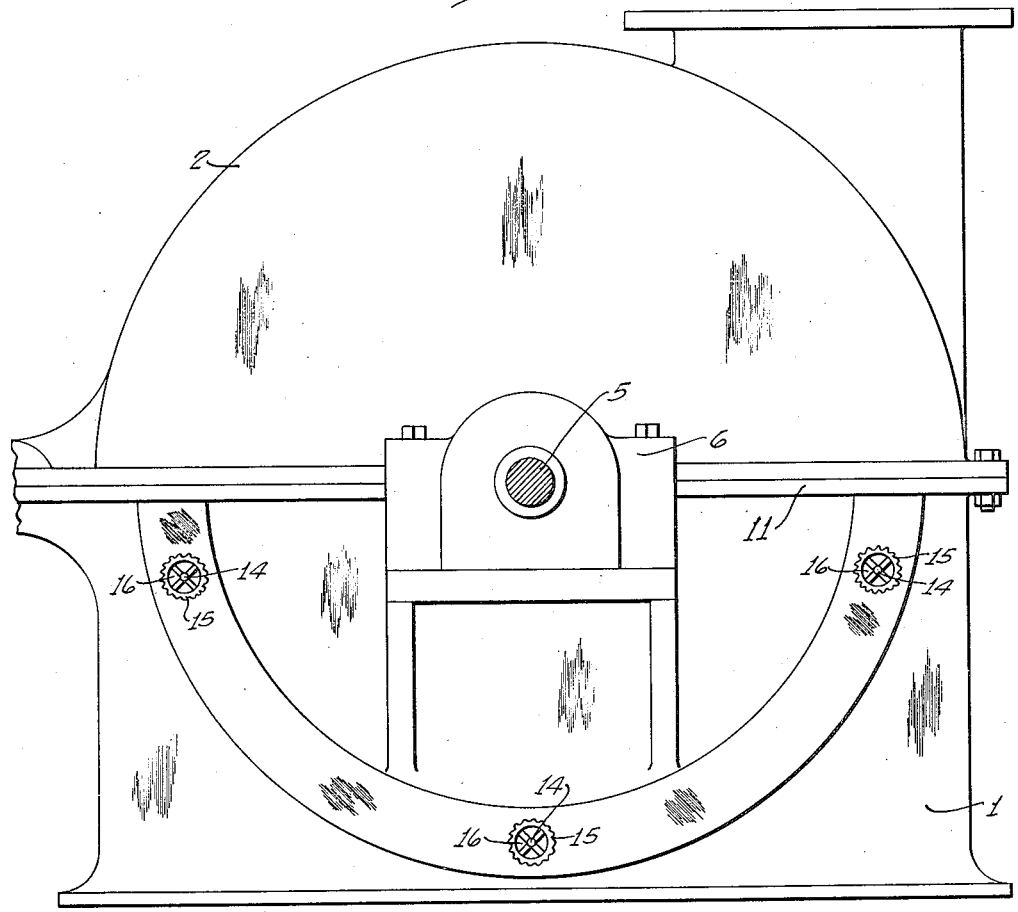
Figure 4:
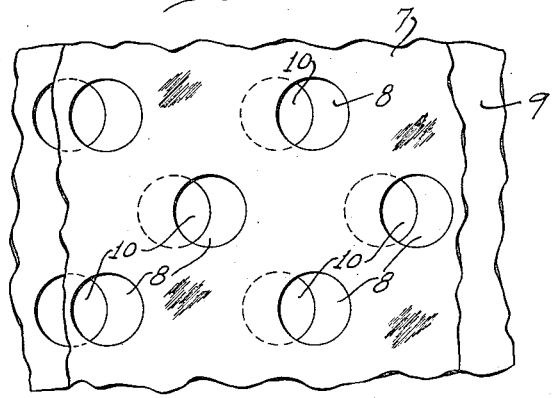
Figure 5:
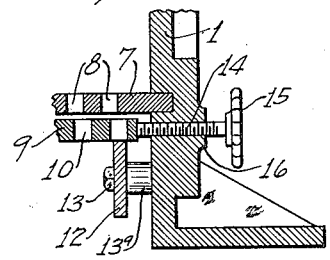

My invention is fully shown in the accompanying drawings wherein similar numerals are used to designate similar parts. Fig. 1 is a cross section of a grinder and shredder embodying my invention; Fig. 2 is a partial view of a grinder and shredder showing the perforated plates; Fig. 3 is a side view of the grinder and shredder; and Figs. 4 and 5 show more clearly details of construction shown in Figs. 1 and 2.

Referring to the figures, the grinder and shredder has the lower housing 1 with the upper housing 2 mounted thereon, as shown in Fig. 3. In the grinding chamber 3 formed in the housings 1 and 2 the hammers 4 are mounted on the axle 5 which rotates in and is supported by the bearings 6. The lower circumferential wall of the grinding chamber 3 is formed by the plate 7 having the perforations 8 therein. This plate 7 is preferably mounted in the substantially semi-circular grooves 17 in the side walls of the lower housing 1, as shown in Figs. 1 and 2. The auxiliary plate 9 having the perforations 10 therein is mounted immediately below and, preferably, in contact with the plate 7, on the ribs 12 which are shaped to conform to the contour of the grooves 17. These ribs are fastened to the side walls of the lower housing 1 by means of the bolts 13 and are, preferably, spaced away from said walls by the washers 13ª. The screw-shafts 14 having the knurled hand grips 15 on the outer ends thereof are threaded through the bosses 16 formed in the side walls of the lower housing 1. The ends of the screw-shafts are adapted to engage the side edges of the auxiliary plate 9, as clearly shown in Fig. 1. The rods 18 are preferably provided between the ribs 12 to prevent the plate 7 and the auxiliary plate 9 from bulging outwardly under the weight of the material being ground or shredded.

The perforations 8 and 10 in the plate 7 and the auxiliary plate 9, respectively, are preferably arranged in rows transversely and longitudinally or axially of the machine, and the perforations in the plate 7 are positioned to register with the perforations 10 in the auxiliary plate 9. The ends of the plates 7 and 9 are maintained in fixed relation in the grooves 11ª in the flanges 11 which form the upper edges of the ends of the lower housing 1. In the embodiment of my invention shown in the drawings the plates 7 and 9 are positioned so that the perforations 8 and 10 are at all times in line transversely, as shown in Fig. 2, but may be moved relative to each other so as to be brought out of longitudinal alinement, as hereinafter described.

When it is desired to grind material to a fineness smaller than the size of the perforations 8 in the plate 7 the screw-shafts 14 on one side of the grinder are moved inwardly by means of the knurled hand grips 15 on the end thereof and the screw-shafts on the opposite side of the grinder are moved outwardly. The auxiliary plate 9 is thereby moved axially of the grinder or transversely of the plate 7, since the screw-shafts 14 are in engagement with the edge thereof, and the perforations 8 are constricted by the partial movement out of register of the perforations 10, as shown in Fig. 4. The auxiliary plate 9 may be moved until the perforations 8 are constricted to leave a very small opening through which ground material may pass. By reversing the operation from that described above and by turning the screw-shafts 14 in an opposite direction, the auxiliary plate 9 may be moved back again until the perforations 8 and 10 are again in register and the material may be passed through the full openings of the perforations without constriction. It is readily seen that any size opening up to the full size of the perforations 8, through which material may be passed may be obtained by adjustment of the auxiliary plate 9.

I do not intend to limit myself to the specific movement of the parts herein described, since the construction of different parts and the means of moving the auxiliary plate 9 may be varied within wide limits without departing from the spirit of my invention.

What I claim as new and desire to secure by Letters Patent, is:

1. A grinder and shredder comprising a housing with a grinding chamber having revolvable hammers mounted therein, a perforated plate fixedly supported by the side walls of said housing to form the lower circumferential wall of said grinding chamber, an auxiliary plate whose transverse dimension is less than the distance between said side walls and having perforations adapted to register with the perforations in said perforated plate, means for supporting said auxiliary plate in juxtaposition with said perforated plate so as to allow transverse movement of said auxiliary plate with respect to said perforated plate, and means whereby said auxiliary plate may be secured in adjusted position between said side walls.

2. A grinder and shredder comprising a housing with a grinding chamber having revolvable hammers mounted therein, a perforated plate fixedly supported by the side walls of said housing to form the lower circumferential wall of said grinding chamber, an auxiliary plate whose width is less than the distance between said side walls and having perforations therein adapted to register with the perforations in said perforated plate, means whereby said auxiliary plate is supported independently of said perforated plate, and means whereby said auxiliary plate may be adjusted between said side walls.

3. A grinder and shredder comprising a housing with a grinding chamber having revolvable hammers mounted therein, a perforated plate arranged to form the lower circumferential wall of said chamber, and auxiliary plate whose transverse dimension is less than the distance between the side walls of said grinding chamber and supported below said perforated plate on ribs spaced from said side walls and arranged to follow the contour of the lower circumferential wall of said chamber, said auxiliary plate having perforations adapted to register with the perforations in said perforated plate, and means whereby said auxiliary plate may be held in adjusted position between said side walls.

4. A grinder and shredder comprising a housing with a grinding chamber having revolvable hammers mounted therein, said housing having side walls with substantially semi-circular grooves arranged on the inner sides thereof, a perforated plate mounted in said grooves to form the lower circumferential wall of said chamber, an auxiliary plate whose transverse dimension is less than that of said perforated plate supported by ribs mounted on and spaced away from the side walls of said housing below said perforated plate and following the contour thereof, said auxiliary plate having perforations therein adapted to register with the perforations in said perforated plate, and screw-shafts extending through the side walls of said housing and threaded therein and adapted to engage the edge of said auxiliary plate whereby said auxiliary plate may be moved transversely of said perforated plate, and may be secured in adjusted position.

In witness whereof I have signed my name to this specification.

HARRY J. SHELTON.